(No Model.)

S. C. SCHOFIELD.
GRINDING MILL.

No. 272,334. Patented Feb. 13, 1883.

WITNESSES:

INVENTOR
Silas C. Schofield
by Robt. H. Wiles
ATTORNEY

UNITED STATES PATENT OFFICE.

SILAS C. SCHOFIELD, OF FREEPORT, ILLINOIS, ASSIGNOR TO THE FREEPORT MACHINE COMPANY, OF SAME PLACE.

GRINDING-MILL.

SPECIFICATION forming part of Letters Patent No. 272,334, dated February 13, 1883.

Application filed July 5, 1882. (No model.)

*To all whom it may concern:*

Be it known that I, SILAS C. SCHOFIELD, a resident of Freeport, in the county of Stephenson and State of Illinois, have invented certain new and useful Improvements in Grinding-Mills; and I do hereby declare the following to be a full, clear, and exact description of the invention, such as will enable others skilled in the art to which it pertains to make and use the same.

My invention relates to improvements in that class of grinding-mills in which the power is applied directly by means of sweeps, and more especially to that class of sweep-mills which are adapted to the grinding of ear corn, as well as shelled or small grain. Its details are set forth in the following specification, and shown in the accompanying drawings, in which—

Figure 1:
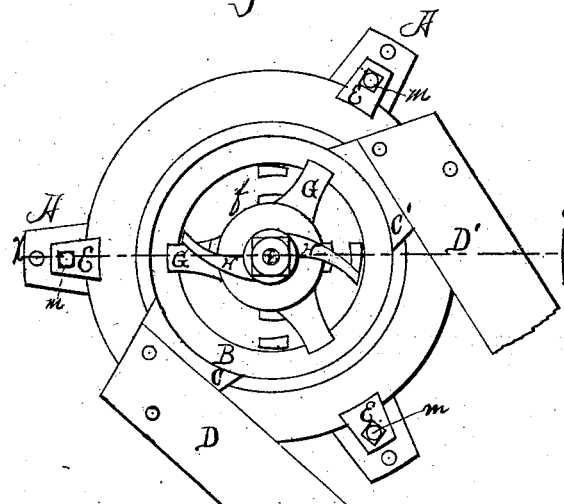
Figure 2:
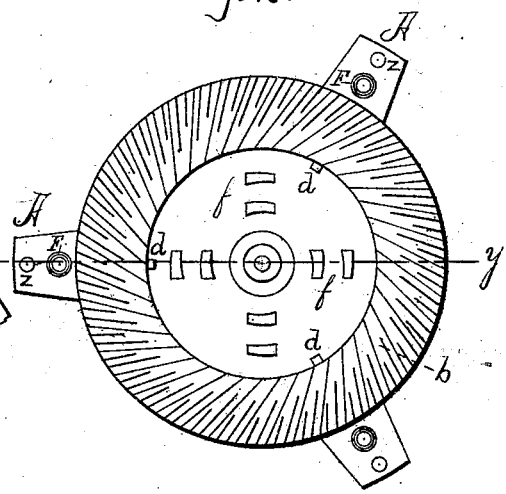
Figure 3:
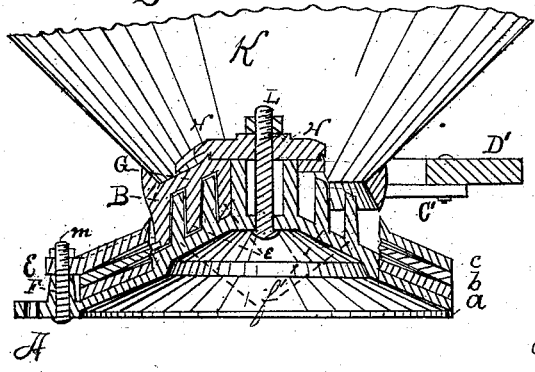
Figure 4:
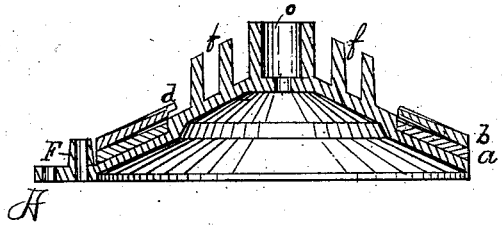

Figure 1 is a top view of the mill with the hopper removed; Fig. 2, a top view of the base-plate of the mill with the middle or loose grinding-ring in position upon it; Fig. 3, a vertical section of the entire mill, the plane of section passing through the line *x y*, Fig. 1; and Fig. 4, a vertical section of the base-plate and loose grinding-ring of the mill through the line *x y*, Fig. 2.

The foundation of the mill is the conical base-plate A, provided with bolt-holes *z*, for attaching it to the meal-box or other structure on which it rests while in operation. On this base-plate rests the stationary grinding-ring *a*, which may be bolted to or formed integrally with it. Above and within the grinding-ring *a*, and upon the upper surface of the conical base-plate, are four sets of breaking-teeth, *f f*, arranged in opposite pairs at right angles to each other, and above and within the breaking-teeth *f f*, and forming the top of the base-plate, is the hollow post or center *o*. The base-plate is formed with three bosses, F, to which is bolted the upper stationary grinding-ring, *c*, provided with grinding-teeth on its lower surface.

Between the grinding-rings *a* and *c* rests a loose grinding-ring, *b*, having grinding-teeth on its lower and upper surfaces, and provided with three lugs, *d*, projecting inwardly beyond the inner circumference of the grinding-rings. The distance between the grinding-rings and the fineness to which the grain is ground are regulated by means of nuts on the bolts *m m m*, passing through the bosses F.

On the hollow post *o*, as a bearing or shaft, is pivoted a hub, B, provided with three preferably radial arms, G, having on their under surfaces breaking-teeth *e*, so placed as to pass through the spaces left by the teeth *f f* of the base-plate. The teeth *e f* may have any desired cross-section, but are preferably corrugated. The outer breaking-tooth of each of the arms G lies just within the inner circumference of the grinding-rings and beside one of the lugs *d* of the middle ring, so that when the hub B is rotated the middle grinding-ring, *b*, is rotated with it. At the same time, however, that the rotary motion of the hub is imparted to the ring *b* the ring is unaffected by any vertical motion of the hub, so that any tendency of the vertical motion of the hub or sweep to cause the rings to bind is avoided. The hub B is provided with a rim for the reception of an ordinary hopper, and with two horizontal flanges, C C', to which are bolted the converging sweeps D D'.

Above the hub B and post *o* is placed a stationary cap formed with two arms, H H, which act as breakers, and this cap is held firmly in place by an ordinary bolt, L, and nut.

The operation of the mill is as follows: Power being applied to the sweep, the hub B is rotated, carrying with it the grinding-ring *b*. The ear corn to be ground is fed into the hopper, and falls between the arms G G, and is broken by them as they pass under the stationary arms H H. It then falls between the breaking-teeth and is broken into smaller pieces, passes between the rings *a b c*, and, being ground into meal, passes out at their outer circumference.

It is evident that the number of sets of breaking-teeth *f f*, the number of arms G G, and the number of stationary arms H H may be varied; but by making these numbers four, three, and two, respectively, as shown, each arm G, with its breaking-teeth, engages with but one stationary breaker at a time, and the breaking-power of the mill is more uniformly and constantly exerted than if the numbers of parts in the different sets were equal.

In the construction of a mill for grinding shelled or small grain alone the hub B may be made without breaking-teeth and the arms H H and breaking-teeth $ff$ may be omitted. In such case, however, the hub B should be provided with three lugs to engage with the lugs $d\ d$ of the loose grinding-ring $b$.

I claim no novelty for the form of grinding-teeth or breaking-teeth used, as neither is new. Neither do I claim as new the use of a grinding-ring having teeth on both faces, or the combination of such a ring with two other rings each having teeth on one face, as I am well aware that flat rings of that description are in common use; but,

Having described my invention, what I claim as new, and desire to secure by Letters Patent, is—

1. In a grinding-mill, the combination of three conical grinding-rings, arranged one upon the other, the lower ring having grinding-ribs upon its upper surface, the upper ring having grinding-ribs upon its lower surface, and the middle ring having grinding-ribs upon both upper and lower surfaces.

2. In a grinding-mill, the combination of two stationary conical grinding-rings having grinding-ribs on their contiguous faces, a loose conical grinding-ring between said stationary rings, and having grinding-ribs on both its faces, and suitable means for rotating said loose grinding-ring.

3. In a grinding-mill, the combination of one loose and two stationary grinding-rings, arranged substantially as described, with a centrally-pivoted sweep-bearing hub, adapted to communicate its rotary but not its vertical motion to said loose grinding-ring.

4. In a grinding-mill, a stationary cone provided with grinding and breaking teeth, substantially as described, in combination with a loose conical grinding-ring and a centrally-pivoted sweep-carrying breaker, adapted to impart rotary but not vertical motion to said loose grinding-ring.

5. In a grinding-mill, the combination of a loose grinding-ring provided with one or more lugs on its inner circumference, and a centrally-pivoted sweep-carrying hub lying within said ring, and provided with one or more arms adapted to engage said lugs and impart the rotary motion of the hub to said grinding-ring, substantially as described.

6. In a grinding-mill, the combination of the conical base-plate A, the grinding-rings $a\ b\ c$, the pivoted sweep-carrying hub B, provided with the breaking-teeth $e$, the stationary cap and breaking-arms H H, and the sweeps D D', all substantially as and for the purpose described.

In testimony whereof I have signed this specification in the presence of two subscribing witnesses.

SILAS C. SCHOFIELD.

Witnesses:
ROBT. H. WILES,
FRANK W. BRAINERD.